United States Patent [19]
Wolfe

[11] Patent Number: 4,784,082
[45] Date of Patent: Nov. 15, 1988

[54] DISPOSABLE LITTER BOX SYSTEM

[76] Inventor: Steven Wolfe, 2024 N. Argyle, Apt. #E, Los Angeles, Calif. 90068

[21] Appl. No.: 933,232

[22] Filed: Nov. 20, 1986

[51] Int. Cl.$^4$ .............................................. A01K 29/00
[52] U.S. Cl. ........................................................ 119/1
[58] Field of Search .............................................. 119/1

[56] References Cited

U.S. PATENT DOCUMENTS

| | | | |
|---|---|---|---|
| 3,233,588 | 2/1966 | Thomas | 119/1 |
| 3,310,031 | 3/1967 | Lowe | 119/1 |
| 3,809,013 | 5/1974 | Rigney et al. | 119/1 |
| 4,190,525 | 2/1980 | Menzel | 119/1 |
| 4,308,825 | 1/1982 | Stepanian | 119/1 |
| 4,312,295 | 1/1982 | Harrington | 119/1 |
| 4,359,966 | 11/1982 | Casino | 119/1 |
| 4,407,231 | 10/1983 | Colborn et al. | 119/1 |
| 4,534,315 | 8/1985 | Sweeney | 119/1 |
| 4,548,160 | 10/1985 | Feitelson | 119/1 |

FOREIGN PATENT DOCUMENTS 1375553  9/1964  France .................................. 119/1

*Primary Examiner*—John J. Wilson
*Attorney, Agent, or Firm*—Beehler, Pavitt, Siegemund, Jagger, Martella & Dawes

[57] ABSTRACT

A cat litter box system including a tray which may have inwardly canted edges and a waterproof bottom. Inserted in the tray is at least one orificed filter sheet, and preferably several, having some type of corner or edge lifting means. Also desirably provided is a filter protector comprising a mat having upward extending protrusions disposed in register with the filter sheet orifices to pass through the latter and protect the filter sheets from damage by the clawing of the cat through litter material which is deposited in the tray over the filter sheets and the filter protector, where the latter is also used. Deodorizing strips, capsules and/or filter protector tips may also be provided.

4 Claims, 5 Drawing Sheets

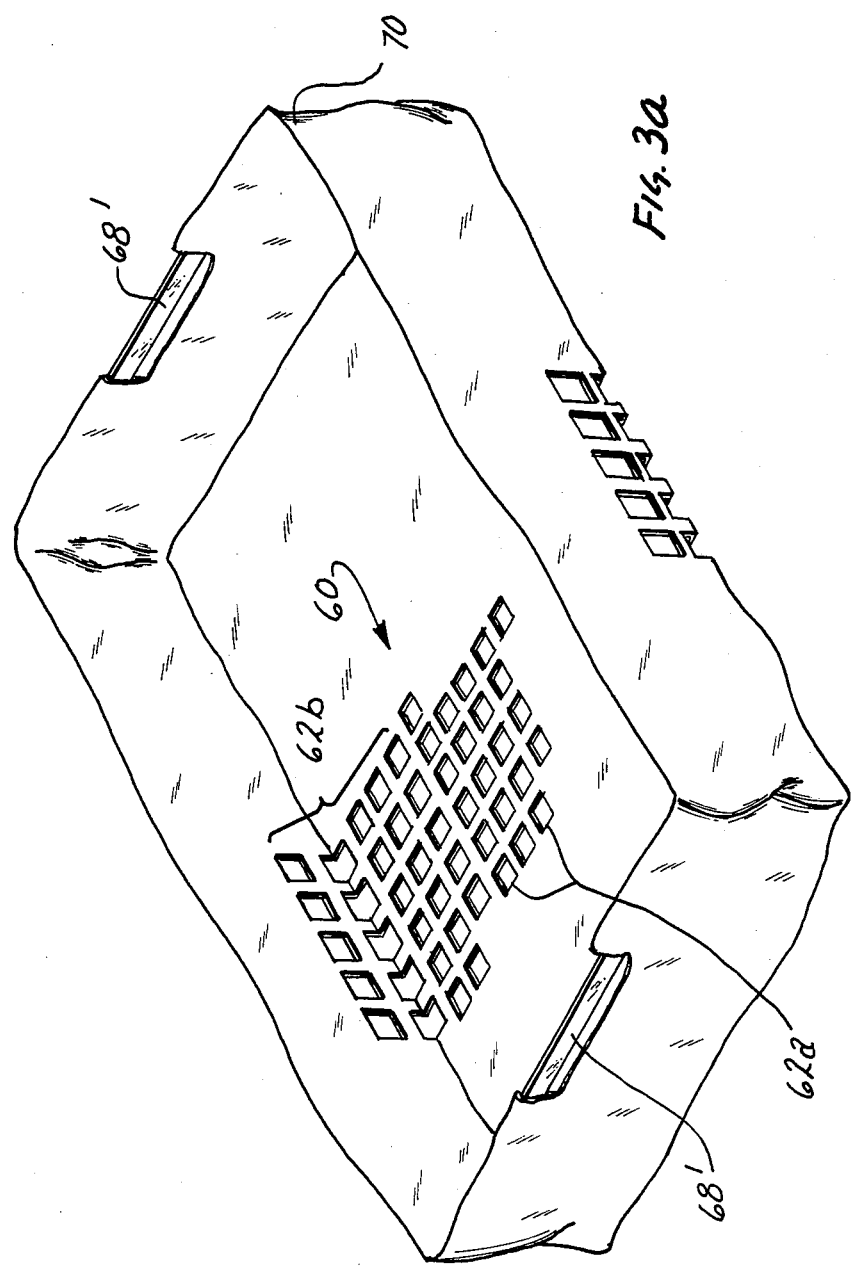

DISPOSABLE LITTER BOX SYSTEM

BACKGROUND OF THE INVENTION

1. Field of the Invention

The present invention relates to the field of litter boxes for small domesticated animals, and particularly for house cats.

2. Description of the Related Art

It is common to provide small domesticated animals which live within human dwelling houses with litter box containers for receiving the excrement of the animal. Such litter box containers are commonly associated with domestic house cats, but are applicable to any animal which, by training or natural inclination, will void itself within an established area.

The most common form of litter box, particularly directed to a house cat, is a square-shaped plastic tub which is filled with urine-absorbant litter material to a depth of 2 to 3 inches, The litter material, or litter compound, may be either clay or granular cellulose. The litter material is normally sifted after a particular period of use, such as 3 days, with a hand-held scoop in order to remove, insofar as is possible by this inexact manual method, accumulated solid animal waste.

Problems are immediately presented by this system. The filtering of the litter material and extraction of the animal feces with a hand tool of any nature is generally unpleasant to humans. It may also be unhealthful in some cases. This is particularly indicated by the warning affixed to the products of most litter box and litter material manufacturers indicating that pregnant women should not clean litter boxes because of the danger of toxoplasmosis. The litter material kicks up dust when it is moved around and sifted—even where the so-called "dust free" litter materials are employed. When the solid waste of the animal is extracted from the litter material, it must be further put into another container, e.g. a plastic bag for disposal. This is a particularly unpleasant, unsanitary, and sometimes messy process.

After the recommended period of use, often 7 to 10 days, has expired, it is necessary to dump the litter material from the tub into a bag for disposal. This process is even more prone to cause dust than the sifting. It is also odorous and messy, and may allow the undesirable escape of the contaminated litter material into the environment of the house.

Further, after disposal of the used litter material, the plastic tub, or litter tray, must itself be cleaned. Litter tray manufacturers generally recommend cleaning and wiping the tray with a solution of ammonia. This task, involving strong chemicals, is not always easily, readily, nor safely performed. Many households do not have sink facilities for washing contaminated litter trays. Although the cleansing of the litter tray need not be performed as often when tray liners (discussed below) are used, it is ultimately essential that any litter tray should be sanitized, or else, due to its exposure to animal urine, it will produce a permeating unpleasant odor.

Certain products have appeared on the market in an attempt to obviate the problems described above. Thus, there exists a composition of non-absorbant, "reusable" litter compound which is used with a special litter box. The urine of the animal flows through the non-absorbant litter compound and through a grid false bottom within the litter box. The perforations of the grid are smaller than the granules of the litter compound, permitting drainage of the urine through the grid into a pan which constitutes the bottom of the box. In addition to requiring periodic disposal of the solid fecal waste of the animal which is deposited in the litter compound, in this system it is most desirable more frequently to dispose of the liquid urine waste of the animal in order to avoid undesirable odors in the house. Thus, the necessity for sifting the litter compound to extract the solid waste, and for cleaning the litter box, are not abated by the use of a "reusable" litter compound.

It is further known that hand-held scoops may be perforated with small openings which facilitate the sifting of the litter material while retaining the solid animal waste. No matter how efficacious the design of the scoop, it still needs to be manually operated, and sifting with it is an unpleasant task. Moreover, the scoop must be cleaned and stored between usages.

Finally, several varieties of litter box liners exist. The liners are both scented and unscented, and come in various sizes and colors. In most cases they are simply a plastic bag. In some cases a 33 gallon 1.5 mil thickness plastic garbage bag, or a cut-down portion thereof, is actually vended as a litter box liner. When such liners are employed, either the entire bag and its contents must be thrown out after a few days, or the litter contents must be sifted in some manner to remove fecal matter.

SUMMARY OF THE INVENTION

The present invention is a system for disposing of the excrement of a small domesticated animal, principally a house cat. The system has, as one component, a specially shaped litter box which is designed to hold granular litter material for use by a domestic animal over an average 7 to 10 day period. The litter box and the litter material contained therein are delivered to the consumer as a unitary package, and are entirely disposable after use.

Moreover, in accordance with the system of the present invention, the disposable litter box provides in a self-contained fashion a capability to manually sift solid waste from the granular litter material by means of disposable feces filters integrally positioned within the box. The disposable feces filters are protected, in their installed position at the base of the litter box below the granular litter material, by a filter protector from being torn or dislodged by the digging or clawing activity of an animal.

After each period of use of the litter box resulting in the accumulation of solid animal waste, the top one of a stack of disposable feces filters is grasped by integral handles and extracted from the litter box, filtering by such extraction the solid waste from the granular litter material which remains within the box. Each of the withdrawn disposable feces filters with the solid fecal waste captured therein, and ultimately the entire litter box itself, is disposed of as substantially biodegradable trash. Each successive disposal may be further aided to transpire in a convenient and sanitary manner by the optimal packaging of plastic refuse bags integrally within the disposable litter box system.

The disposable litter box system of the present invention supports the function of disposing of the waste of a domesticated animal in a completely self-contained manner. No tools, nor chemical, nor litter material is required to be used on or added to the disposable litter box system. The disposable litter box system is packaged for the consumer as a unit which is self-contained in all respects. During use of the disposable litter box unit, the user periodically extracts the solid wastes of the animal by using a feces filter integrally provided within the system of the invention, and ultimately disposes of the entire litter box itself. With the optimal inclusion of plastic bags within the disposable litter box system, even the successive intermediate and final disposals are completely supported by elements integrally packaged within the system.

The present invention has aspects directed to several separate elements, namely: (1) a box particularly adapted to be the litter box of an animal; (2) a feces filter for extracting the feces from the relatively smaller granular compound within which the feces is buried; and (3) a floor guard for the interior cavity of a litter box, which floor guard is also particularly adaptable for the protection of the filter, for which purpose the floor guard may be called a "filter protector".

The present invention also has aspects directed to a litter disposal system. Particularly, the three preferred elements of the invention are interoperative in various combinations taken one, two, or three elements at a time in order to produce a disposable litter box system which accords convenient and sanitary disposal of all wastes of a small domesticated animal. The preferred embodiment system apparatus of the invention consists of all three inventive elements of (1) the particularly adapted litter box, (2) several of the plastic feces filters, and (3) the filter protector retaining and protecting the filters within the litter box, in further combination with (4) granular litter material and (5) optional plastic bags for receiving used system components.

The three separate elements of the invention do not need to be used with each other, nor in accordance with the system of the invention; but the elements are most efficacious when used in combination.

A water-resistant litter box element in accordance with the present invention is preferably of a special shape which benefits compact packaging and which also benefits a containment function of the box. The litter box element is inexpensively made, preferably of waxed cardboard, and is entirely disposable. Each of the sidewalls of the rectangular box desirably presents at its top edge a lip which is folded inwardly toward the other sidewalls at an angle of approximately 45 degrees. The inclined lips define may be entered and used by a small animal. The inclined lips particularly prevent litter from being thrown from the box when a housecat is covering its spoor. The folded inclined lips result from a special fold at each corner of the box.

The box is delivered for use with a replaceable cover which closes the top opening and depresses the inclined lips. When the cover is removed, special corner folds cause the inwardly folded lips at the top of the sidewalls to spring into position.

When the litter box is delivered for use as an element of a disposable litter box system, it preferably contains granular litter material, several disposable feces filters, one filter protector, and (optionally) several plastic bags.

The disposable feces filter elements of the present invention preferably are made from plastic sheets shaped to conform to, and cover the bottom and side walls inside the box. Each disposable filter contains a matrix of a large number of holes in its central position. This matrix of holes covers an area of the plastic disposable feces filter roughly equal to the entire inside bottom area of the litter box. When the disposable litter box is delivered for use, several superimposed disposable feces filters may be provided on the bottom of the box and covered with a preselected amount of granular litter material. After several days of evacuation in the litter box by a cat, the uppermost filter is raised, desirably by its corner extension elements secured to, or by an encircling drawstring around, the edges, to move the litter material inwardly. Thereby the litter material is sifted through the holes to drop back into the box, while the solid fecal waste of the animal is retained within the sheetlike filter. The filter, with its captured animal excrement, may then be emplaced within a plastic bag which is optionally packaged within the litter box cover or otherwise disposed of as substantially biodegradable trash.

Where a filter protector element in accordance with the present invention is employed within the litter box, it may take one of several forms. In one form, it may be formed in the bottom wall of the box itself. Alternatively, it may be constructed as a separate mat of plastic placed on the bottom wall of the box. In either event, it presents a complex surface with a multiplicity of small mounds, minature hillocks, protuberances, or protrusions. Between the hillocks are depressions. The preferred filter protector comprises a matrix of upwardly extending frustoconical protrusions which are substantially equal in number to, and disposed in register with, the holes in the stacked disposable feces filters. Thus, the frustoconical protrusions of the filter protector may pass upwardly through the holes of each of several superimposed disposable feces filters when both the filter protector and the overlying filters are positioned at the inside bottom of the litter box. The protrusions of the filter protector prevent the digging activity of a cat within the granular litter material from causing damage to the disposable filters. It is a feature of the present invention, however, that the use of a filter protector may be optional. Thus, if the litter material to be provided within the box is of sufficient depth (e.g., 3-4 inches), it is unlikely that the cat will dig deep enough to damage the filters. On the other hand, if, for weight or other considerations, it should be desired to limit the litter material depth to only one inch or two, the filter protector becomes necessary to prevent the cat's claws from tearing the thin plastic filter sheets.

In accordance with one preferred system of the invention, after a succession of the disposable feces filters have at various times been withdrawn, with each filter upon withdrawal capturing the accumulated solid waste of the animal, then the entire litter box may be disposed of. When this is to be done, the cover of the litter box is replaced and securely retained by exposed adhesive strips. This disposal may optionally be aided by use of a plastic bag which may be packed within the litter box, in a position affixed to the inside of the cover. When this plastic bag is used, then the entire covered disposable litter box is positioned and sealed within such bag, and disposed of in a sanitary manner as substantially biodegradable trash.

From the preceding discussion of the disposable litter box system of the present invention, it may be seen that no tool, nor litter material, nor chemical, nor any item whatsoever is brought to, used upon, or applied to the litter box in accomplishing its several functions. The manual operations required to be performed are performable in a sanitary and convenient manner. These and other aspects of the present invention will become increasingly clear by reference to the following speciiication and attached drawings.

BRIEF DESCRIPTION OF THE DRAWINGS

FIG. 3a is a similar perspective view of the filter component after its corner has been folded to fit inside the tray, but showing a modified orifice matrix.

DESCRIPTION OF THE PREFERRED EMBODIMENT

Figure 1:
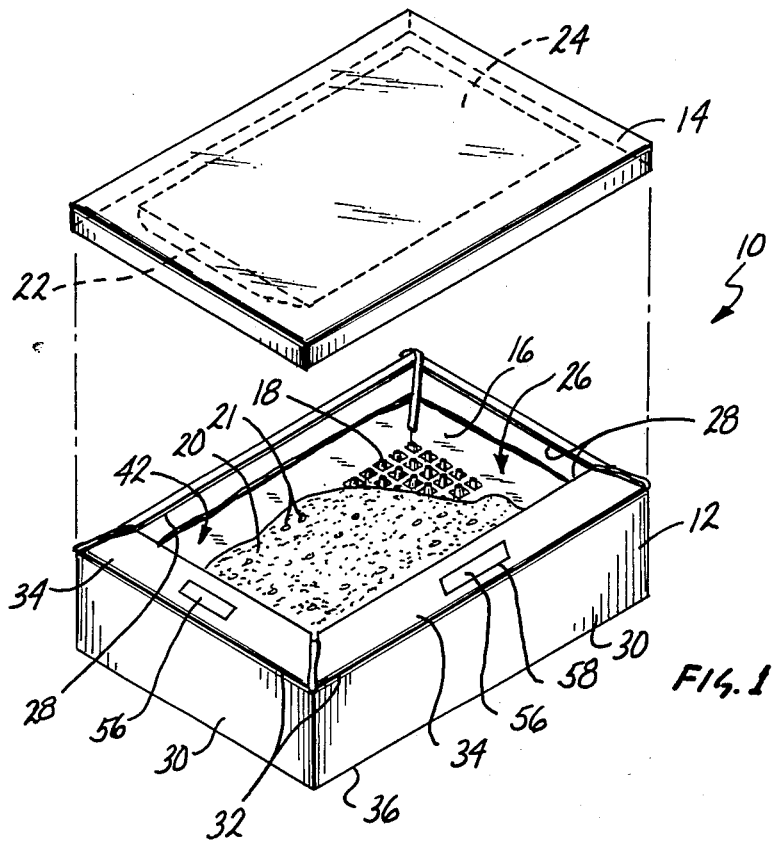
FIG. 1 is an exploded perspective view of the disposable litter box system of the present invention.
Figure 7:
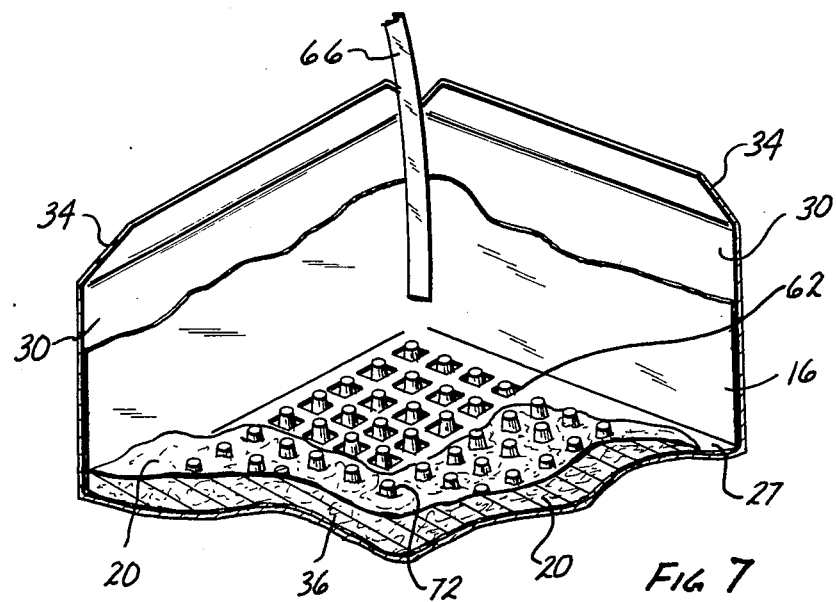
FIG. 7 is a perspective view of a tray with a plastic liner.

Referring to in FIG. 1 of the drawings, the covered litter box 10 components of the invention consist of litter receptacle or tray 12 and tray cover 14. Within the interior of tray 12 is visible a topmost one of a plurality of disposable feces filters 16 (shown further in FIG. 3). The feces filters 16 are protected by a filter protector 18 (shown further in FIG. 4). Deposited on top of both the feces filters 16 and the filter protector 18 is a quantity of granular or other litter material 20. The assembly may optionally incorporate folded plastic bags 22 contained within a pouch 24 affixed to the underside of cover 14. The tray 12 is preferably made of water-resistant waxed cardboard with its waxed surface on the interior. If the tray 12 has seams 23 (FIG. 2a); they may be covered with a water-resistant tape 25 affixed by a water-resistant adhesive (not shown). The tray 12 may alternatively be made water-resistant, or waterproof, by being molded of plastic, or by being lined with a plastic liner 27, such as is shown in FIG. 7.

The preferred size of the litter tray 12 is 20" long by 15" wide by 5" deep. A centrally located top opening 26 is defined by the upper edges 28 of each of the four sidewalls 30. Each of the sidewalls 30 is folded inwardly along crease lines 32, thereby creating lips 34. When the cover 14 is initially placed over the tray 12, the upper lips 34 of the sidewalls 32 will be depressed inwardly so that the lip planes are substantially parallel with the bottom 36 of the tray 12.

When the cover 14 is removed, however, because of special "V"-shaped folds 40 provided at each corner 38, where the lips 34 abut each other, the lips will elevate to an angle of approximately 45 degrees relative to its sidewall. When so elevated by the inherent force resulting from the corner folds, the lips 34 will define a centrally disposed top opening 26 of approximately 18" by 13".

Figure 2A:
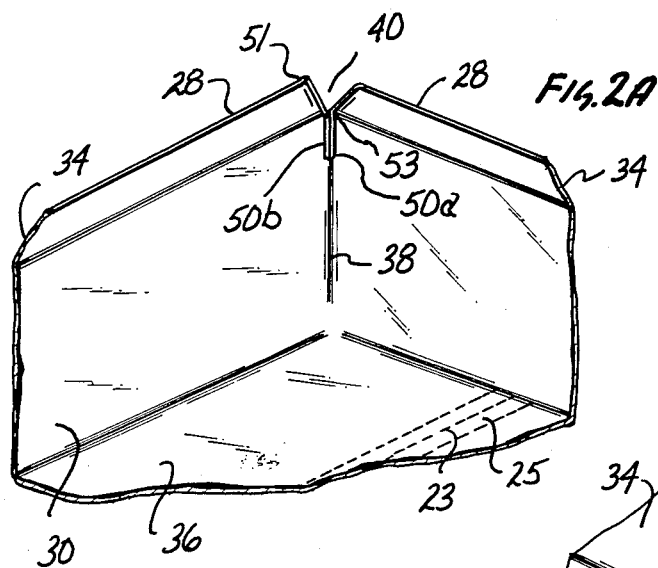
FIG. 2a and FIG. 2b respectively are enlarged detailed perspective interior and exterior views of a top corner of the tray portion of the litter box of FIG. 2.
Figure 2B:
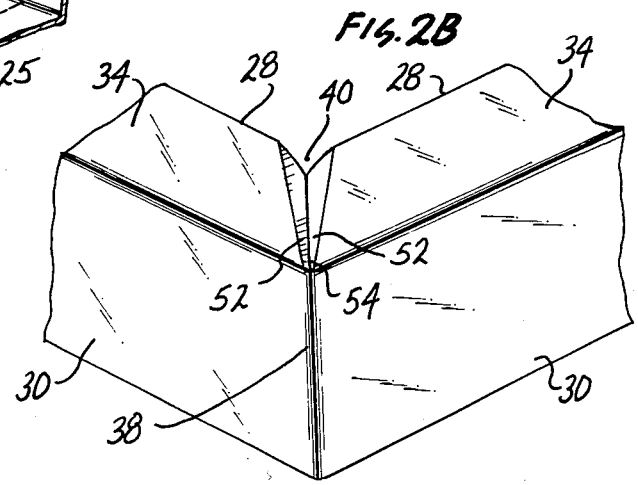

The special "V"-shaped fold 40 at each tray corner 38, which causes the lips 34 of the sidewalls 30 to assume the 45 degree angle position, is shown from a view inside the tray 12 in FIG. 2a, and from a view outside in FIG. 2b. To produce the fold 40 a portion 50a of each abutting edge 52 of adjacent sidewalls 30 is bent inwardly at a first angle 51 from a selected point 54 along where the sidewalls 30 abut, and is overlapped at a second angle 53 with a similar bent-in portion 50b of the abutting edge 52 of the adjacent wall 30, and is glued or otherwise secured in such overlapped disposition. Resultantly, the conformal memory of the cardboard, which wants to assume the planar surface within which it was fabricated, provides a mechanical force at the location of the special folds 40 which serves to push apart the two cardboard surfaces connected at such fold. This separating force causes, within the configuration of tray 12, the lip extensions 34 of the sidewalls 32 to assume the angular position shown in the drawings.

The top opening 26 as thus defined by the lips 34 is particularly directed to preventing granular litter material 20 from being thrown out of the box when the cat is "covering its spoor". The folded sidewall lips 34 which thus rise into angular position also reduce the overall volume of the covered litter box 10 when packaged.

Also illustrated in FIG. 1 are areas of sticky adhesive 56 upon the surface of the sidewall lips 34. These adhesive areas 56 are normally covered by plastic protectors 58. When the plastic protectors 58 are removed, then the exposed adhesive area 56 will secure the cover 14 to the tray 12 when it is replaced. Although the adhesive 56, and the inside surface (not shown) of the cover 14 to which such adhesive mates, can be made to allow repetitive adhesions, such as, once during initial packaging, and later, for trash disposition, it is not normally so made. Instead, the cover 14 may be held affixed to the tray 12 during both initial shipment and sale by external packaging, such as cellophane-type overwrap or banding (not shown). The adhesive areas 56 when exposed by removal of the plastic protectors 58, are for permanently reaffixing the cover 14 before final disposal of the entire disposable litter box combination.

Figure 3:
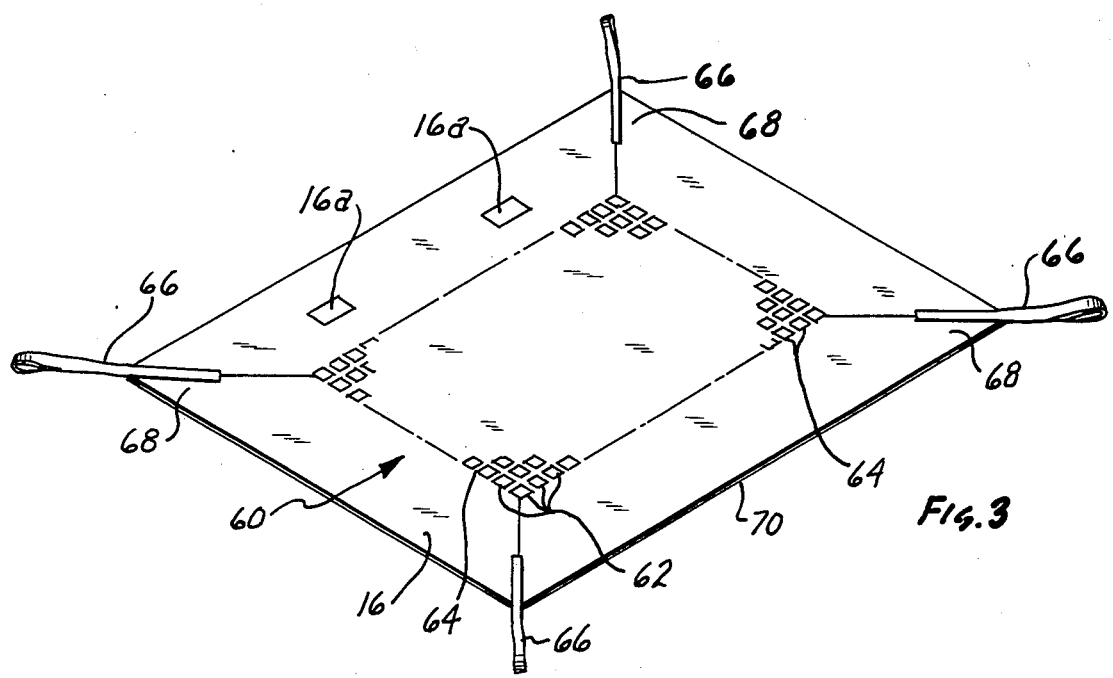
FIG. 3 is a perspective view of the disposable feces filter component of the disposable litter box system of the present invention, with the filter laid out flat and before it is folded.

A single disposable feces filter 16, one of the several superimposed such filters shown in FIG. 1, is shown in FIG. 3. The filter 16 may be made from a plastic sheet and is shaped to conform to the inside of the litter tray 12. For the litter tray 12 of the preferred size of 20"1×15"w×5"d, the filter 16 before shaping to conform with the inside of the tray 12, may be 29"1×24"w of at least 1.2 mils thick plastic, such as polyethylene.

Within each disposable feces filter 16 as best shown in FIG. 3 there is a centrally located matrix 60 of orifices 62. This matrix 60 is preferably a rectangular grid of 15 by 20 orifices 62, or 300 total orifices 62, each of which is ½" square with a ⅝" separation 64. The matrix grid 60 of orifices 62 covers an area substantially equal to the entire inside bottom wall 36 of the tray 12. The dimension, separation, and shape of the filter perforations, or holes, are chosen to permit the most efficient filtering of granular cat litter 20 while retaining solid animal excrement. The ½" square orifices 62 are sized to be smaller than the feces, or excrement, of a house cat for which the disposable litter box combination of the present invention would most likely be used. If the orifices 62 are smaller than ½" square, then used granular litter material may not pass through the filter 16. Round and hexagonally shaped holes have not been found to be as efficacious for quick filtering and secure retention of excrement as square orifices 62 of the preferred embodiment. The separations 64 between orifices 62 leave adequate material 64 to securely support the feces.

Figure 6:
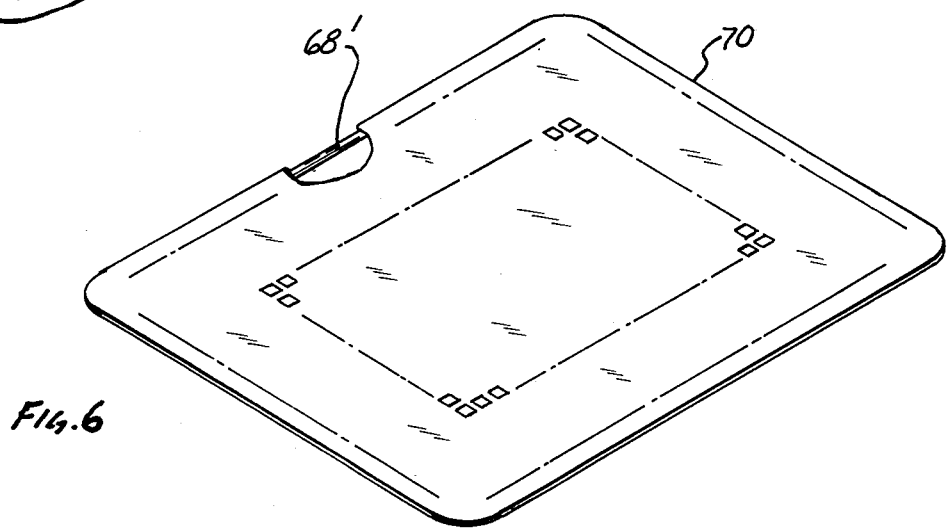
FIG. 6 is a perspective view of a filter having a drawstring in lieu of attached corner extension elements shown in FIGS. 3, 5a, and 5b.

Each disposable feces filter 16 preferably incorporates extension plastic strips, or string-like elements 66 at its four corners 68. These elements 66 enable the filter 16 to be extracted from within the litter tray 12. Alternatively, as illustrated in FIG. 6, a drawstring 68' may be provided around the edges 70 of the filter 16, which drawstring 68', when pulled, will tend to bring the edges 70 together and allow the filter 16 to be lifted from the tray 12 slowly, thereby sifting the feces from the granular litter 20 which falls back into the tray 12.

Since the edges 70 are thus brought together when the filter 16 is lifted off of the filter protector 18, it may be desirable to improve the rate of passage of the litter material 20 through the filter 16 outwardly of the orifices 62. To this end, as shown in FIG. 3a, the size of the orifices 62b may be increased at least slightly in direct proportion to the distance of the orifices 62b from the central orifices 62a.

Figures 4, 4A:
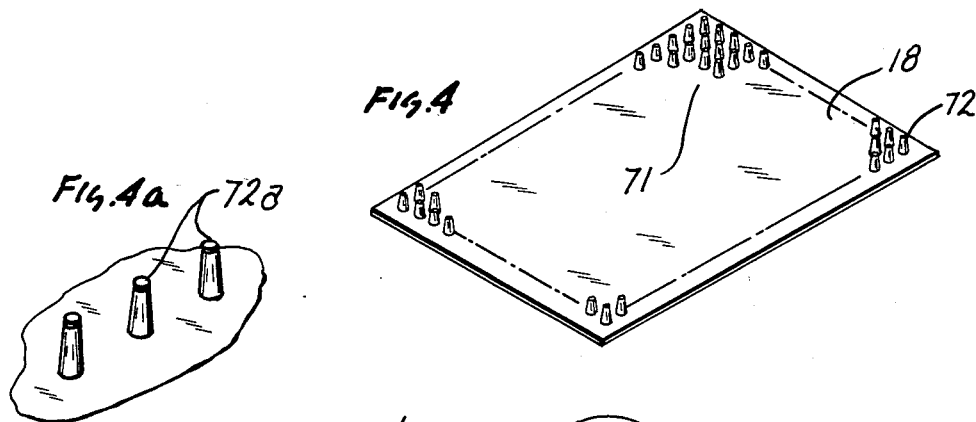
FIG. 4 is a perspective view of a filter protector component of the disposable litter box system of the present invention.
FIG. 4a is a detail of a modified filter protector protrusion.

The details of the preferred filter protector 18, are shown in FIG. 4. The filter protector 18 is of a width and a length substantially equal to the interior dimensions of tray 12. It presents an upper surface having a regular matrix 71 of identical raised protrusions 72. The matrix 71 of protrusions 72 is such in disposition and protrusion size and shape as to register with the matrix 60 of orifices 62 in each of the disposable feces filters 16. Consequently, there would be a rectangular matrix of 15 rows by 20 columns of protrusions 72, or 300 total protrusions. Each of the protrusions 72 is preferably $\frac{5}{8}''$ high of frustoconical shape varying from a bottom diameter of $\frac{1}{2}''$ to a top diameter of $\frac{3}{8}''$. Although it is not necessary, the bottom diameters of the protrusions 72 could be increased correspondingly to any increase in the sizes of the orifices 62b as hereinabove described.

The protrusions 72 correspond in size to the orifices 62 within the filter 16 but are preferably not of a cross section corresponding to the orifices 62. Within the system of the present invention a frustoconical, conical, or cylindrical peg-like protrusion 72 will, by its circular cross-section surfaces, optimally defeat any attempt by a digging or clawing animal to destroy such protrusion. Furthermore, circular cross-sectioned protrusions 72, when positioned within the corresponding square orifices 62 readily permit the easy withdrawal of the disposable feces filter 16. The litter 20 will not jam against the sides of the protrusions 72 to result in ripping of the filter 16.

An operative combination of the disposable feces filter 16 shown in FIG. 3 and the filter protector 18 shown in FIG. 4 is shown in FIG. 1. The matrix 71 of protrusions 72 (shown in FIG. 4) of the filter protector 18 fits through the orifices 62 of the matrix 60 (shown in FIG. 3) of each filter 16. A stack of several of the disposable feces filters 16, which are preferably plastic sheets, may be simultaneously fitted upon a single filter protector 18. The number of filters 16 so fitted is a function of the service life of the cat litter 20 and of the proportion of solid versus liquid wastes which is to be expected from the animal using the disposable litter box system. Normally three disposable feces filters 16 are initially arrayed upon the filter protector 18 in each litter box 10.

Referring further to FIG. 1, the interoperative organization of the components of the present invention may now be better understood. The litter tray 12 portion of the covered litter box 10 is water-resistant to hold urine fluids which may not be absorbed by, or may otherwise pass down through the litter 20. This water-resistance may be accomplished by the construction of the tray 12 itself from water impermeable waxed cardboard, tape, and glue. However, it would alternatively be possible to obtain water-resistance and watertightness by providing, before installing any other component of the system of the present invention, an inner liner plastic bag 27, of 1.2 mils thickness, as shown in FIG. 7. Therefore, when a "water-resistant" or "watertight" litter receptacle or tray is referred to within this application, it should be recognized that it could be of plastic, or of sealed waxed cardboard, or of porous cardboard which is lined with a fluid impermeable inner liner 76, such as a plastic bag.

Next installed within the water-resistant litter tray 12 shown in FIG. 1 is the filter protector 18 with its upwardly extending protrusions 72. A stack, ordinarily three in number, of the disposable feces filters 16 is fitted over the protrusions 72 of the filter protector 18. The plastic filters 16 further line the tray 12. The string-like elements 66 conveniently fit at the corner folds 40 of the tray 12, as illustrated in FIG. 1.

Finally, deposited within the covered litter box 10 is the granular litter material 20. Ordinarily (depending upon type), approximately 10 pounds of litter material 20 will be provided for a medium size house cat using the disposable litter box system of the present invention. This will support use by one animal for a seven to ten day period. The granular litter material 20 shown in FIG. 1 is usually evenly distributed in the tray 12 to a depth of $2\frac{3}{4}$ inches, thereby covering the protrusions 72 of the filter protector 18. However, regardless of the shallowness of the litter material 20, the filters 16 are protected from being torn or dislodged by the scratching or digging activity of the animal because of the protrusions 72 of filter protector 18.

When packaged with the box cover 14 affixed, the components of the disposable litter box system illustrated in FIG. 1 are not subject to becoming permanently disarrayed, even if the litter box 10 is turned upside down during shipment prior to use. In order for the consumer to bring the disposable litter box system into operative use, it is merely necessary to set the litter box 10, right side up, upon the floor and remove the cover 14 from the tray 12.

Figure 5A:
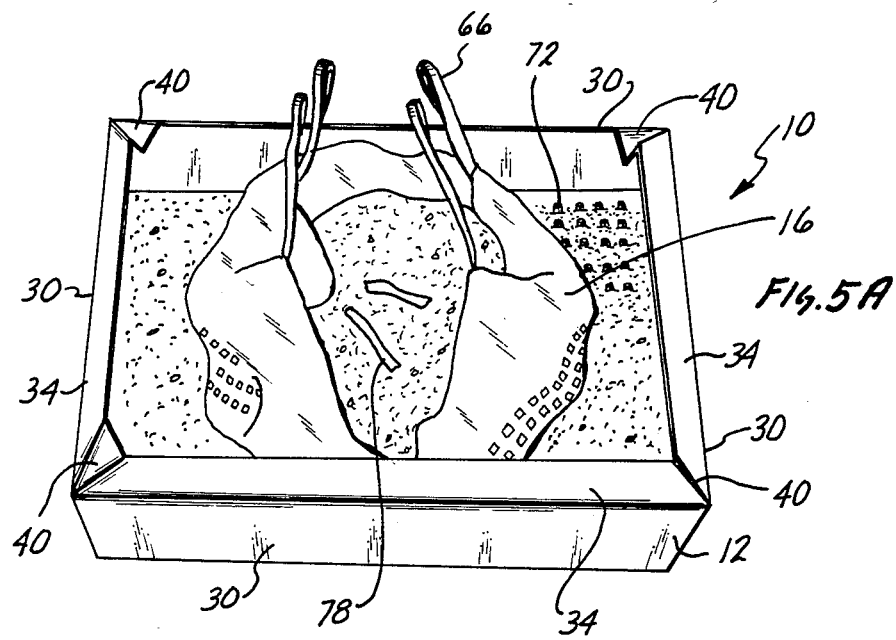
FIGS. 5a and 5b, illustrate the manner in which withdrawal of a disposable feces filter from the litter box tray is accomplished in accordance with the present invention.
Figure 5B:
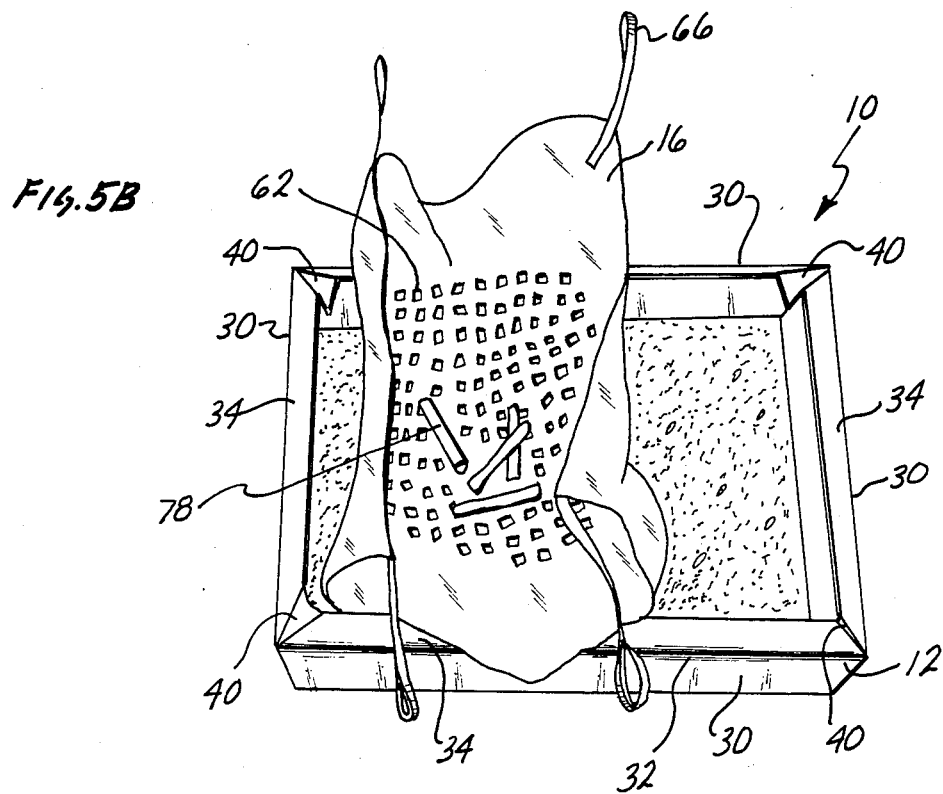

The step of disposing of animal solid waste in accordance with the system of the present invention is shown in time sequence in FIG. 5a and FIG. 5b. The litter tray 12 is normally purged of feces and/or other solid waste 78 after a variable period, depending upon how many cats are using the box and whether the box is the exclusive receptacle for the excrement of such cats. Normally a medium size house cat exclusively using the litter box 10 of the present invention will accumulate sufficient excrement 78 so that the extraction operation shown in FIGS. 5a and 5b should be performed every two or three days. If several disposable feces filters 16 are provided in each litter box system, then the final filtered extraction of solid waste 78 might occur as early as the sixth, or as late as the ninth, day of service.

Without any disposable feces filters 16 left within the litter tray 12, the tray 12 still has a two or three day service life before it should be disposed of. Although a nine to twelve day, and longer, use period of the disposable litter box system of the present invention is possible for a single medium size house cat, it is intended that the entire combination should provide a usual service life of between eight and twelve days.

Referring further to FIGS. 5a and 5b, it may be seen that the corner elements 66 of the uppermost disposable feces filter 16 are pulled together, and upwardly lift the filter 16 and bring its corners toward each other. The litter 20 will fall through the orifices 62 within the feces filter 16, while the feces 78 is retained as shown in FIG. 5b, where it may be seen that the granular litter material 20 has fallen through the orifices 62 within the disposable feces filter 16 and remains within the litter tray 12. Meanwhile, the solid waste 78 has been retained within the filter 16 and the latter and its contents may be disposed of. This disposal may optionally be facilitated by use of plastic bags 22, which may be packaged in the pouch 24 inside the cover 14. When a plastic bag 22 is used for disposal, then the disposable feces filter 16 with the solid animal waste 78 contained therein is entirely placed within this plastic bag 22, and disposed of as trash.

At such time as the consumer desires to dispose of the entire disposable litter box 10, the cover 14 is replaced on top of the tray 12 after removing plastic protectors 58 over sticky areas 56 upon the sidewall lips 34 of the box 10. The plastic protectors 58 so removed may be summarily discarded inside the tray 12.

It should be understood that the litter tray 12 may be re-covered, and discarded, prior to use of any or all of the disposable feces filters 16. There is no requirement that the excrement filtering process of the present invention be used to its completion, or at all, in order to enjoy the utility of a litter box 10 which is itself disposable.

From the foregoing discussion of the disposable litter box system of the present invention, it may be seen that a number of elements are synergistically interactive to produce a system which is efficient, self-sufficient, and easy to use. It should be recognized that alternative implementations of the system elements are possible without departing from the spirit of the present invention. For example, it is not necessary that the tray 12 be rectangular. The litter tray 12 could, instead, be of a pentagonal, hexagonal, octagonal or other geometric shape (not shown). Also it is not necessary that the litter box 10 be made exclusively of waxed cardboard. Plastic, and regular cardboard with an inner water-tight liner, alternatively would suffice as materials for providing of the litter box tray 12 of the present invention. Further, it is not necessary that the granular litter material 20 be homogeneous. The top layers could be of low absorbency and perfumed while the lowest layers could be high absorbency. It should be recognized that the system of the present invention is compatible with totally non-absorbent litter material used in combination with an absorbent pad component incorporated either in the filter protector 18 component itself, or as a pad located below a porous filter protector.

Likewise, it should be recognized that the particular geometries of the disposable feces filters 16 and of the filter protector 18 which are shown in the drawings and herein described are preferred only, and do not represent the only manner of providing these components and their combination.

Figure 8:
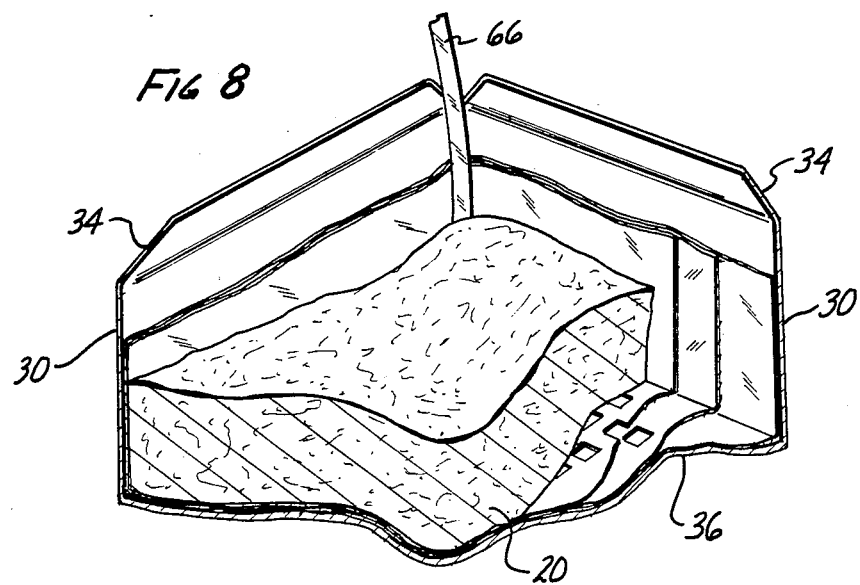
FIG. 8 is a section of a tray with no filter protector.

It would also be possible to provide a litter box without a filter protector 18 altogether. Thus, as illustrated in FIG. 8, several stacked filters 16 are simply packed into the bottom of the tray 12 and covered to a sufficient depth (e.g., 3-4 inches), with sand or other granular litter type material 20. With material of such a depth, it is highly unlikely that any cat would dig deep enough to tear any of the stacked filters 16. After a few days of use of the box 10, the top filter 16 may be lifted up to sift out the feces, and disposed of in the same manner as has been described for the preferred embodiment where the filter protector 18 is utilized.

It would also be desirable to utilize a deodorant compound, such as an ortho dichlorobenzine with petroleum distillates of the type sold by Willert Home Products, Inc. of St. Louis, Mo., as its ONE DROP All Purpose Household Deodorizer, in the litter box of the present invention. As is well understood, such a compound is usually encapsulated in some type of extremely thin film, which, when ruptured by any scraping or a pressure application, becomes activated to block odor detection in the nostrils of persons in the vicinity which may be permeated by an offensive odor. This compound may have particular application to the litter box of the present invention, and could be employed either as small balls 21 disposed in the litter material 20 itself, as a strip 12a on a side well of the tray 12, the tips 72a of some of the protrusions 72 (FIG. 4a), or as tear strips 16a between filters 16 (FIG. 3), to be ruptured upon removal of an upper filter sheet, or in any combination thereof.

In accordance with the preceding discussion of alternatives, it is obvious that the components of the disposable litter box system of the present invention can be adjusted in order to attain different objectives. The longevity of the system may be adjusted by the amount and nature of litter material 20, and by the number of disposable feces filters 16, which are employed. The economy of the system may be adjusted by the manner of construction of any of the components of the litter box 10, the disposable feces filters 16 and/or the filter protectors 18. The aesthetic appearance of the system may be varied by the use of color and/or graphics design.

The preferred embodiment herein illustrated and described is directed to use by a housecat over a moderate period. However, the system of the invention could be adapted to other uses. For example, humans confined in emergency shelters or prisons could conceivably use the system of the present invention. Corresponding to these possibilities for variation, the present invention should be interpreted in accordance with the following claims

I claim:

1. In combination, a protector for the interior cavity of a cat litter box containing letter material, said cavity being defined by a bottom wall and side walls extending upwardly from the bottom wall, said protector comprising a mat, said mat being an area coextensive with the bottom wall and of a height which is a small fraction of the height of the side walls, said mat being substantially flat on its underside and presenting on its upper side an array of protrusions and depressions, said protrusions extending upwardly into the litter material; and at least one sheet-like filter element of a greater extent than the mat and defining a matrix of orifices, the orifices being in register with the array of protrusions on the upper side of the mat, said filter element being interoperatively combined with said mat in such manner that the protrusions extend upwardly through the orifices in the filter element so that the filter element is disposed in the mat depressions, and the protrusions further extend into the litter material, to a height sufficient to prevent a cat digging in the litter material from clawing and ripping the filter element in the depressions.

2. The combination according to claim 1 wherein the protrusions are frustoconical protrusions in a regular arraym and the depressions form regularly shaped throughs between the protrusions.

3. The combination as described in claim 1 wherein the mat is integral with, and comprises at least a portion of the bottom wall of the cat litter box.

4. The combination as described in claim 1 wherein both the array of protrusions and the matrix of orificies are located centrally of the bottom wall of the litter box, and the cross sectional diameters of at least some of the protrusions and the diameters of the orifices in registry therewith of the matrix, which are disposed more remotely from the centermost area of the array of protrusions, are of a larger size than the cross sectional areas and diameters, respectively, of the protrusions and orifices in the centermost area of the array of protrusions.

* * * * *